(12) United States Patent
Baker

(10) Patent No.: US 6,394,507 B1
(45) Date of Patent: May 28, 2002

(54) APPARATUS FOR CONNECTING TUBULAR BODIES

(76) Inventor: William J. Baker, 11164 Calle Oro Verde, Valley Center, CA (US) 92082

( * ) Notice: Subject to any disclaimer, the term of this patent is extended or adjusted under 35 U.S.C. 154(b) by 0 days.

(21) Appl. No.: 09/686,203

(22) Filed: Oct. 10, 2000

Related U.S. Application Data

(60) Provisional application No. 60/160,132, filed on Oct. 18, 1999.

(51) Int. Cl.[7] .............................................. F16L 17/00
(52) U.S. Cl. ..................... 285/368; 285/334.1; 285/412
(58) Field of Search ................................ 285/368, 412, 285/336, 334.1, 334.2

(56) References Cited

U.S. PATENT DOCUMENTS

| | | | | |
|---|---|---|---|---|
| 969,423 | A | * 9/1910 | Tanner et al. | 285/334.2 X |
| 3,387,867 | A | * 6/1968 | Rogers | 285/368 X |
| 3,490,796 | A | * 1/1970 | Smith, Jr. | 285/412 |
| 3,507,506 | A | * 4/1970 | Tillman, III | 285/334.2 X |
| 4,403,795 | A | * 9/1983 | Davlin | 285/334.2 X |
| 4,410,186 | A | * 10/1983 | Pierce | 277/2 |
| 4,428,603 | A | * 1/1984 | Davlin | 285/368 |
| 4,921,284 | A | 5/1990 | Singeetham | |

FOREIGN PATENT DOCUMENTS

| | | | | |
|---|---|---|---|---|
| DE | 1037219 | * | 8/1958 | 285/368 |
| DE | 2459661 | * | 7/1976 | 285/368 |
| DE | 2830185 | * | 1/1979 | 285/368 |
| FR | 1119305 | * | 6/1956 | 285/368 |
| FR | 1146303 | * | 11/1957 | 285/368 |
| FR | 1179405 | * | 5/1959 | 285/368 |
| GB | 67929 | * | 2/1915 | 285/412 |
| GB | 773541 | * | 4/1957 | 285/368 |
| GB | 781144 | * | 8/1957 | 285/368 |
| IT | 599211 | * | 10/1959 | 285/368 |
| JP | 44218 | * | 4/1979 | 285/368 |

OTHER PUBLICATIONS

Flier: "Taper–Lok," 2 pages. Autoclave Engineers, Erie, Pennsylvania. Admitted prior art.
Fig. 9E: Clamped Flow Fittings; Crosses and Tees, p. 101 from *API Specification 6A: Wellhead Equipment*, Mar. 1983, 14th Ed.
"Specification for Wellhead and Christmas Tree Equipment," pp. 10–1, 10–2, 10–3, 10–8, 10–9, 10–13, 10–26, 10–27, and 10–28. *API Specification 6A*. Admitted prior art.
"Subsea Wellhead and Christmas Tree Equipment," pp. 29, 35, 36, and 40. *API Specification 17D*. Admitted prior art.
R. Eichenberg, "Design of High–Pressure Integral and Welding Neck Flanges with Pressure–Energized Ring Joint Gaskets," 3 pages from ASME paper. McEvoy Company, Houston, Texas. Admitted prior art.
Figure 5–3 and Appendix D from Fire Test Study prepared by Harry Sweet & Associates for the American Petroleum Institute, Jul. 1982, 3 pages.
Grayloc catalogue, 3 pages, admitted prior art.

\* cited by examiner

*Primary Examiner*—Teri Pham Luu
(74) *Attorney, Agent, or Firm*—Browning Bushman P.C.

(57) ABSTRACT

An apparatus for connecting first and second tubular bodies comprising first and second flange assemblies, each of which has a hub and an annular flange in surrounding relationship to the hub, the hubs and flanges having engageable, complementary frustoconical surfaces that, when the first and second flange assemblies are subjected to compressive loading by means of threaded studs and nuts, cooperate to urge seal faces on the hubs into metal-to-metal sealing contact.

22 Claims, 5 Drawing Sheets

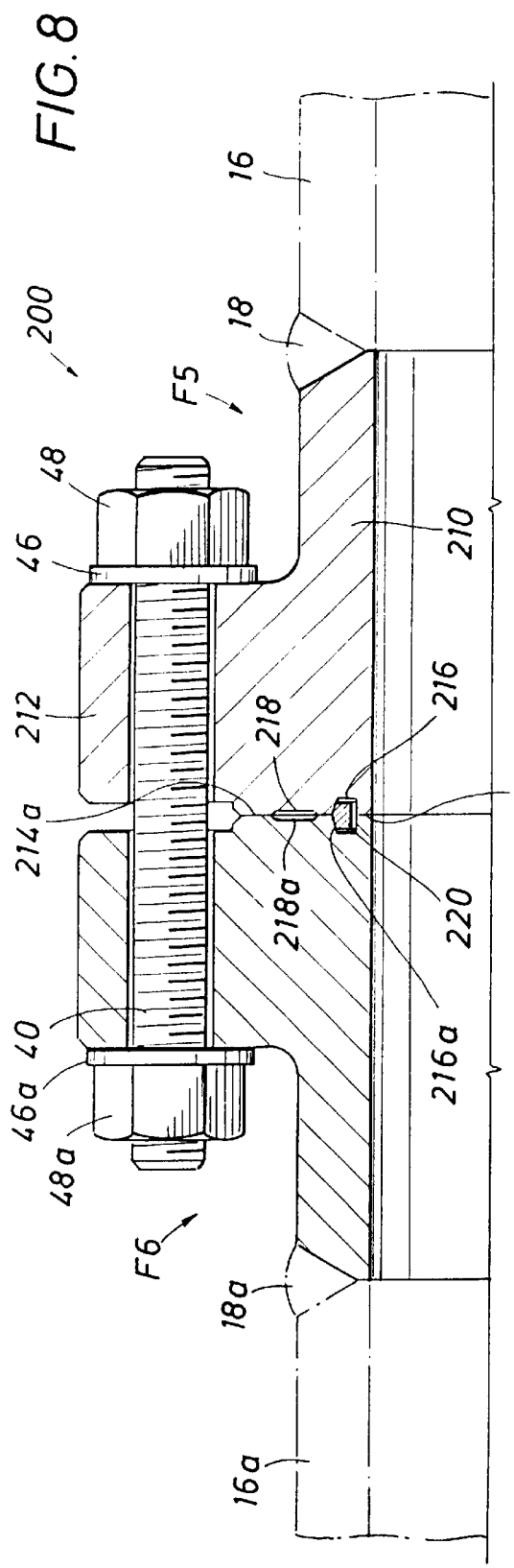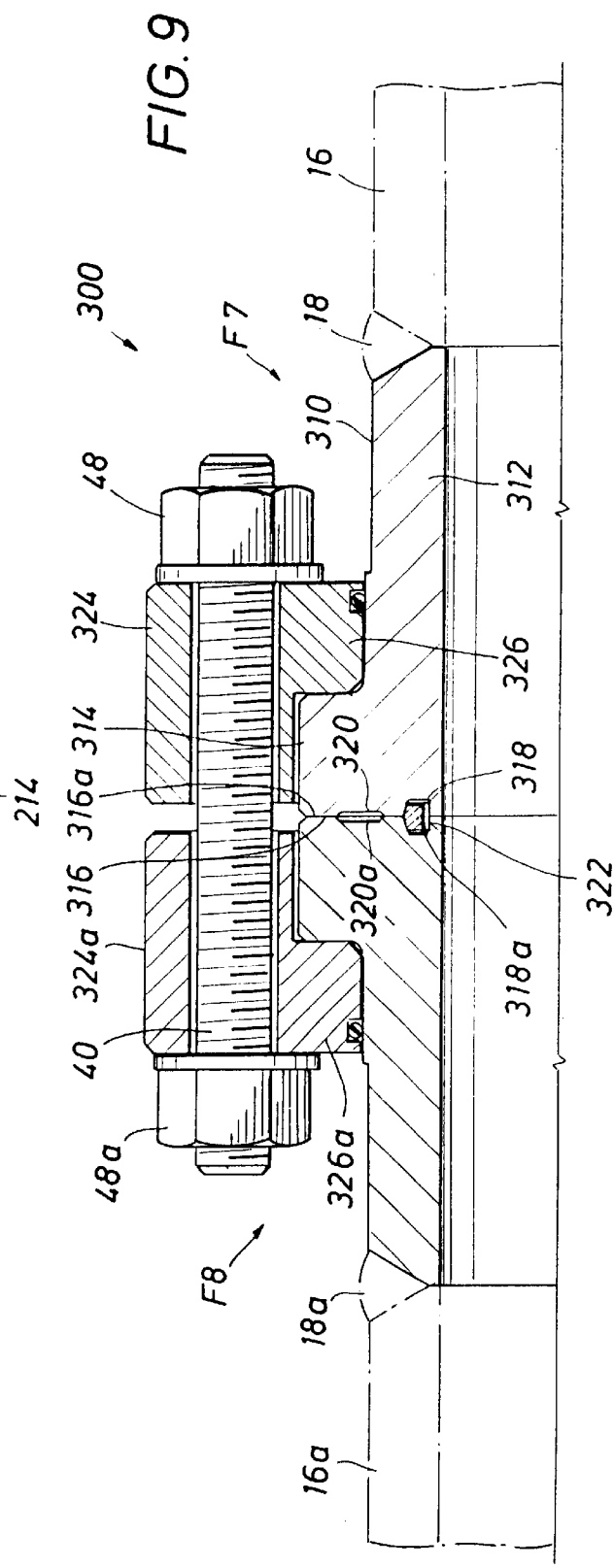

APPARATUS FOR CONNECTING TUBULAR BODIES

CROSS-REFERENCE TO RELATED APPLICATIONS

This application claims the benefit of U.S. Provisional patent application Ser. No. 60/160,132, filed Oct. 18, 1999.

BACKGROUND OF THE INVENTION

1. Field of the Invention

The present invention relates to apparatuses for connecting body components such as tubular members.

2. Description of the Prior Art

Connections between pipe sections, a pipe section and a valve, or between any two bodies having tubular portions that are connectable to provide a fluid flow passage are commonly made using flange assemblies. One type of flange assembly, commonly referred to as a swivel flange assembly, has two subassemblies, each having a flange or collar that is rotatable and axially movable relative to a hub or nipple. In these swivel flange assemblies, the hub or nipple is provided with a radially outwardly facing, annularly extending groove into which are received split ring segments. The split rings project radially outwardly from the groove in the hub or nipple and provide a right-angled shoulder against which one flange is urged as it is bolted to the adjoining flange. This shoulder supports the loads imposed by the bolts holding the flange assemblies together. While other prior art swivel-type flange assemblies have tapered hubs and flanges, for all intents and purposes the taper angle is so large, e.g., 65°, that they behave essentially like a right-angled shoulder. Because of this type of shouldering, high stress concentrations are created at the juncture of the shoulder(s) and the hub(s) or nipple(s).

In flange assemblies, both of the standard and swivel type, metal seal rings have been utilized to obtain metal-to-metal sealing between the two flange subassemblies. Typically, this has necessitated that a metal seal ring, or at least a portion thereof, be compressed between the hub faces by the nut and bolt assemblies used to clamp the flange subassemblies together. However, in these types of prior art flange assemblies, there typically is not metal-to-metal sealing between the hub faces themselves as opposed to being between the hub faces and the seal ring or a portion thereof compressed therebetween.

SUMMARY OF THE INVENTION

It is therefore an object of the present invention to provide an apparatus for connecting tubular bodies.

A further object of the present invention is to provide an apparatus for connecting tubular bodies in fluid-tight engagement with one another, which provides a metal-to-metal seal.

Still a further object of the present invention is to provide an apparatus for connecting tubular bodies together that can withstand high bending moments.

Yet a further object of the present invention is to provide an apparatus for connecting tubular bodies together that provides separate metal-to-metal seals.

The above and other objects of the present invention will become apparent from the drawings, the description given herein, and the appended claims.

In one embodiment, the apparatus of the present invention includes a first flange assembly that comprises a first hub defining a first flow path and having a first, substantially annularly extending, radially outwardly facing frustoconical hub surface, a first annularly extending, axially facing hub seal face, and a first connection end for connecting to a first tubular body. The first frustoconical hub surface has its greatest diameter more proximate the first hub seal face than the first connection end. The first flange assembly further includes a first annular flange in surrounding relationship to the first hub and having a first axial end, a second axial end, and a first annularly extending, radially inwardly facing frustoconical flange surface, the first frustoconical flange surface and the first frustoconical hub surface being complementary to one another. The first frustoconical flange surface extends substantially from the first end to the second end of the first annular flange. The second flange assembly of the present invention includes a second hub defining a second flow path and having a second, substantially annularly extending, radially outwardly facing frustoconical hub surface, a second annularly extending, axially facing hub seal face, and a second connection end for connecting to a second tubular body. The second frustoconical hub surface has its greatest diameter more proximate the first hub seal face than the second connection end. The second flange assembly further includes a second annular flange in surrounding relationship to the second hub and having a first axial end, a second axial end, and a second, annularly extending, radially inwardly facing frustoconical flange surface that is complementary to the second frustoconical hub surface. The second frustoconical flange surface extends substantially from the first axial end to the second axial end of the second annular flange. A compression assembly, e.g., nuts and bolts, operatively connected to the first and second flange members, urges the first and second flange assemblies toward one another.

In another embodiment of the present invention, there is provided an apparatus for connecting first and second tubular bodies together comprising a first flange assembly and a second flange assembly. The first flange assembly has a first hub that defines a first flow path and a first substantially annularly extending, radially outwardly facing frustoconical hub surface and a first, annularly extending, axially facing hub seal face. The first hub further has a first connection end for connecting to a first tubular body, the first frustoconical hub surface having its greatest diameter more proximate the first hub seal face than the first connection end. The first flange assembly further includes a first annular flange in surrounding relationship to the first hub, the first flange having a first annularly extending, radially inwardly facing frustoconical flange surface that is complementary to the first frustoconical hub surface. The second flange assembly includes a second hub defining a second flow path and having a second, substantially annularly extending, radially outwardly facing frustoconical hub surface and a second, annularly extending, axially facing hub seal face. The second hub further has a second connection end for connecting to a second tubular body, the second frustoconical hub surface having its greatest diameter more proximate the first hub seal face than the second connection end. The second flange assembly further includes a second annular flange in surrounding relationship to the second hub, the second flange having a second annularly extending, radially inwardly facing, frustoconical flange surface that is complementary to the second frustoconical hub surface. A compression assembly, operatively connected to the first and second flange members, urges the first and second flange assemblies toward one another and the first and second hub seal faces into metal-to-metal sealing engagement. The angle between an axis coaxial with the first and second flow path when the first and second hub seal faces are in metal-to-metal sealing engagement and an imaginary line passing through either of the frustoconical surfaces on the first and second hubs is from 10° to 30°.

In still a further embodiment of the present invention, there is provided an apparatus for connecting first and second tubular bodies together that comprises first and second flange assemblies. The first flange assembly has a first hub defining a first flow path and having a first, annularly extending, axially facing hub seal and a first annular flange in surrounding relationship to the first hub. The second flange assembly comprises a second hub defining a second flow path having a second, annularly extending, axially facing hub seal face and a second annular flange in surrounding relationship to the second hub. The compression assembly, operatively connected to the first and second flange members, urges the first and second flange assemblies toward one another. There is a first interconnection between the first hub and the first flange and a second interconnection between the second hub and the second flange whereby when the compression assembly urges the first and second flange assemblies together, the first and second hub seal faces are urged into metal-to-metal sealing engagement. The first hub seal face and the second hub seal face have first and second annular registering seal ring grooves, respectively, each of the first and second seal ring grooves having an annular, radially innermost wall, an annular, radially outermost wall, and an axially facing end wall connecting the radially innermost and radially outermost walls, the radially outermost walls having radially inwardly facing, annularly extending frustoconical groove surfaces, the frustoconical groove surfaces having their greatest diameter more proximate the hub seal faces than the end walls. An annular metallic seal ring has a first portion received in the first seal ring groove and a second portion received in the second seal ring groove. The first portion of the seal ring groove has a first, radially outwardly facing, annularly extending frustoconical seal ring surface complementary to the frustoconical surface in the first seal ring groove, and the second portion of the seal ring has a second, radially outwardly facing, annularly extending frustoconical seal ring surface complementary to the frustoconical groove surface in the second groove. The seal ring also has a second radially inwardly facing, annularly extending seal ring surface and opposed, axially facing end surfaces. The frustoconical surfaces on the seal ring are dimensioned relative to the frustoconical surfaces in the groove such that, prior to metal-to-metal engagement or sealing between the first and second hub seal faces, there is interference engagement between all of the frustoconical surface on the first portion of the seal ring with at least a portion of the frustoconical surface in the first groove and all of the frustoconical surface on the second portion of the seal ring with at least a portion of the frustoconical surface in the second seal ring groove. Additionally, the seal ring is dimensioned relative to the registering seal ring grooves such that the axially facing end surfaces of the seal ring are spaced from the axially facing end walls and the second seal ring surface is radially spaced from the radially innermost walls of the seal ring grooves when the hub seal faces are in metal-to-metal, preferably sealing, engagement. The angle between an axis coaxial with the first and second flow paths when the hub seal faces are in metal-to-metal engagement and an imaginary line passing through either of the frustoconical surfaces on the seal ring is from 5° to 25°.

In yet another embodiment of the present invention, there is provided an apparatus for connecting first and second tubular bodies together, as described just immediately above, but wherein the seal in the first and second seal ring grooves is made up of a first seal ring segment received in the first seal ring groove and a second seal ring segment received in the second seal ring groove. The first seal ring segment has a first axially facing seal ring face; a first, opposed axially facing end surface; a first, radially outwardly facing, annularly extending frustoconical seal ring segment surface complementary to the frustoconical groove surface in the first seal ring groove; and a first, annularly extending, radially inwardly facing seal ring segment surface. The second seal ring segment has a second axially facing seal ring face; a second, opposed axially facing end surface; a second, radially outwardly facing, annularly extending frustoconical seal ring segment surface complementary to the frustoconical groove surface in the second seal ring groove; and a second, annularly extending, radially inwardly facing seal ring segment surface. The first frustoconical seal ring segment surface is dimensioned relative to the first frustoconical surface in the first seal ring groove, and the second frustoconical seal ring segment surface is dimensioned relative to the frustoconical surface in the second seal ring groove such that there is interference engagement between substantially all of the first frustoconical seal ring segment surface and at least a portion of the first frustoconical surface in the first seal ring groove, and between substantially all of the second frustoconical seal ring segment surface and at least a portion of the frustoconical surface in the second seal ring groove prior to metal-to-metal engagement or sealing between the first and second hub seal faces. The first and second seal ring faces on the first and second seal ring segments are in metal-to-metal sealing engagement when the first and second hub seal faces are in metal-to-metal engagement. The seal ring segments are also dimensioned relative to the seal ring grooves such that the first end surface is spaced from the axially facing end wall of the first groove, the second end surface is spaced from the axially facing end wall of the second groove, and the first and second radially inwardly facing seal ring segment surfaces are spaced from the first and second radially innermost walls in the first and second grooves, respectively, when the first and second hub seal faces are in metal-to-metal, preferably sealing, engagement. The angle of the frustoconical surfaces on the seal ring segments is as described above with respect to the single seal ring.

BRIEF DESCRIPTION OF THE DRAWINGS

FIG. 8 is a quarter-section view of a connection apparatus employing the novel metal seal ring in the present invention; and FIG. 9 is a view similar to FIG. 8 showing another version of a connection apparatus using the novel seal ring of the present invention.

DESCRIPTION OF THE PREFERRED EMBODIMENTS

Figure 1:
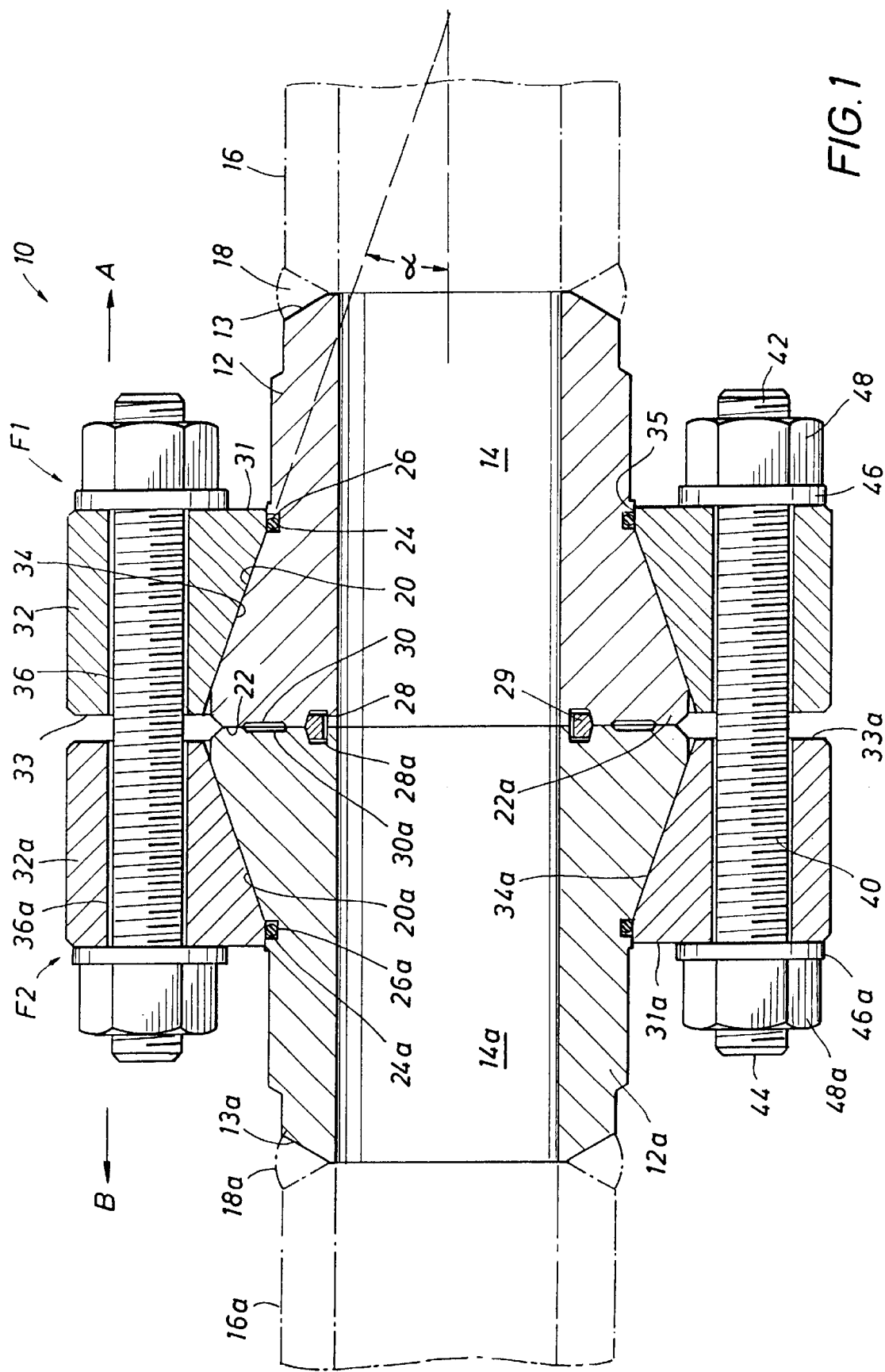
FIG. 1 is an elevational view, partly in section, of one embodiment of the connection apparatus of the present invention.

In one embodiment, the connection apparatus of the present invention is of the swivel flange type---i.e., the flange portion of the assembly, prior to being connected, is free to rotate and move axially in at least one direction with respect to the hub. With reference then to FIG. 1, the connection apparatus, shown generally as 10, comprises a first flange assembly $F_1$ and a second flange assembly $F_2$. Flange assembly $F_1$ comprises a first hub 12 that is generally tubular in nature and has a passageway 14 therethrough. Hub 12 has a connection end 13 adapted to be connected to a pipe or the like, shown as 16 in phantom, by means of welding shown at 18. It will be understood that other methods of connecting hub 12 to tubular members such as 16 can be employed if desired. Hub 12 is monolithic and has a hub seal face 22 and an annularly extending, radially outwardly facing frustoconical hub surface 20, surface 20 having its greatest diameter more proximate seal face 22 than connection end 13. Formed in the hub seal face 22 is an annularly extending, axially facing seal ring groove 28 and an annularly extending relief 30, a seal, such as seal ring 29, described more fully hereinafter, being received at least partially in groove 28.

First flange assembly $F_1$ further includes an annular flange 32 disposed in surrounding relationship to hub 12. When unconnected, flange 32 is free to rotate around hub 12 and can be disconnected from hub 12 by movement in the direction of arrow A before end connection 13 is welded to tubular 16. Flange 32 has opposed, axially facing flange faces 31 and 33 and an annularly extending, radially inwardly facing frustoconical flange surface 34 that is complementary to frustoconical hub surface 20. Flange 32 is further provided with a series of circumferentially spaced bores 36.

Flange assembly $F_2$ is substantially identical to flange assembly $F_1$, with the exception that the end connection 13a on flange assembly $F_2$ is welded to a different tubular member 16a. For convenience, the components of flange assembly $F_2$ have been labeled with the same reference numerals as used in describing flange assembly $F_1$, with the exception that the reference numerals are followed by the letter "a." As is flange 32, flange 32a is rotatable relative to hub 12a and, when hub 12a is not connected to tubular member 16a, can also be moved axially in the direction of arrow B to remove flange 32a from hub 12a.

To connect flange assemblies $F_1$ and $F_2$, holes 36 and 36a are brought into register and studs 40 placed therethrough. Studs 40 have a first threaded end 42 extending out of flange 32 and a second threaded end 44 extending out of flange 32a. Received on the ends 42 and 44 are optional washers 46 and 46a and threaded nuts 48 and 48a, respectively. It will thus be seen that as nuts 48 and 48a are evenly tightened, frustoconical surfaces 20 and 34 on flange assembly $F_1$ and 20a and 34a on flange assembly $F_2$ will be forced tightly together, which in turn will force seal faces 22 and 22a into engagement, forming a metal-to-metal seal therebetween. Optional O-ring seals 24 and 24a received in annular grooves 26, 26a in conjunction with a gasket 23 (see FIG. 2) disposed between flange faces 33, 33a provide weather-tight sealing of connection apparatus 10.

As can be seen, in effect, because there are no abutments or abrupt changes in the contours of surface 34, 20 and 34a, 20a, surface 34 is ramped up surface 20, while surface 34a is ramped up surface 20a from the compressive force exerted by the threaded studs 40 and the nuts 48 and 48a. A unique feature of the connection apparatus of the present invention is that surfaces 34 and 34a are the only surface on the ID of flanges 32, 32a, respectively, that contact the hub surfaces 20, 20a, respectively. In other words, frustoconical surfaces 34, 34a extend substantially from end faces 33, 33a, respectively, to the other end faces 31, 31a, respectively, of flanges 32, 32a, respectively. This provides maximum frustoconical surface area available at the load-bearing surfaces to absorb the loads imposed by the studs 40 and nuts 48, 48a. Indeed, save for the small cylindrical portion of flanges 32, 32a that are in contact with O-ring seals 24, 24a, respectively, the entire inner surface of flange 32---i.e., surface 34---is in contact with the frustoconical surface 20 of flange 12, a like situation existing with respect to frustoconical surface 34a and frustoconical surface 20a. It will also be observed that the small cylindrical surface 35 will never contact the frustoconical surface 20; i.e., the only force-transmitting contact between the flange 32 and the hub 12 is through the mating frustoconical surfaces 34, 20, respectively. It is to be understood that the interengaged frustoconical surfaces on the hubs and flanges are leveraged together by the load imposed by the threaded studs and nuts. The clamping load developed by tightening studs 40 and nuts 48, 48a is applied to the frustoconical surfaces and results in compressive stresses being developed in hubs 12 and 12a. Such compressive stresses are beneficial because they can reduce and often completely offset tensile stresses resulting from internal flow line pressure.

Preferably, the angle of the frustoconical surfaces, shown as α and measured with respect to an imaginary line passing through the surfaces 20, 34, 20a, 34a, and the centerline X of the connection assembly 10 will range from 10° to 30°, more preferably from about 12° to about 25°.

As noted, hub seal faces 22 and 22a form metal-to-metal seals without the necessity of any seal rings; however, such metal-to-metal sealing necessitates that the surfaces 22, 22a be flat with good finishes and that the threaded studs 40 and nuts 48, 48a be evenly tightened. Metal-to-metal sealing between hub face seals 22 and 22a is enhanced by choosing a face contact area that develops compressive stresses in the range of 60% to 90% of the yield point of the material of hubs 12 and 12a as a result of tightening studs 40 and nuts 48, 48a to the prescribed clamp load. Additionally, it is preferred that surfaces 22, 22a have a finish of approximately 63 to 100 RMS, which can be accomplished, for example, by making a face cut on a lathe. As is well known, such a face cut will result in a surface with peaks or crests generated by the cutting tool. Although slight, these peaks or crests can be felt if a fingernail is run over the surface. However, when the load imposed by studs 40 and bolts 48, 48a results in a calculated compressive stress on the faces 22, 22a of 60% to 90% of the yield point of the material of the hubs, the yield point of the material of the peaks or crests will be exceeded, forcing the peaks or crests to flatten, creating a metal-to-metal seal. As noted above, hub seal faces 22, 22a are provided with annular reliefs 30, 30a, which helps to ensure that a metal-to-metal seal is obtained between surfaces 22 and 22a by reducing the contact area, thereby ensuring that the compressive forces exerted by the studs 40 and bolts 48, 48a is sufficient to result in a metal-to-metal seal. Indeed, it will be appreciated that the reliefs 30, 30a can be varied in size to suit varying conditions of operating pressure and expected bending moments on the connection assembly 10 to as to ensure continued metal-to-metal sealing.

Figure 3:
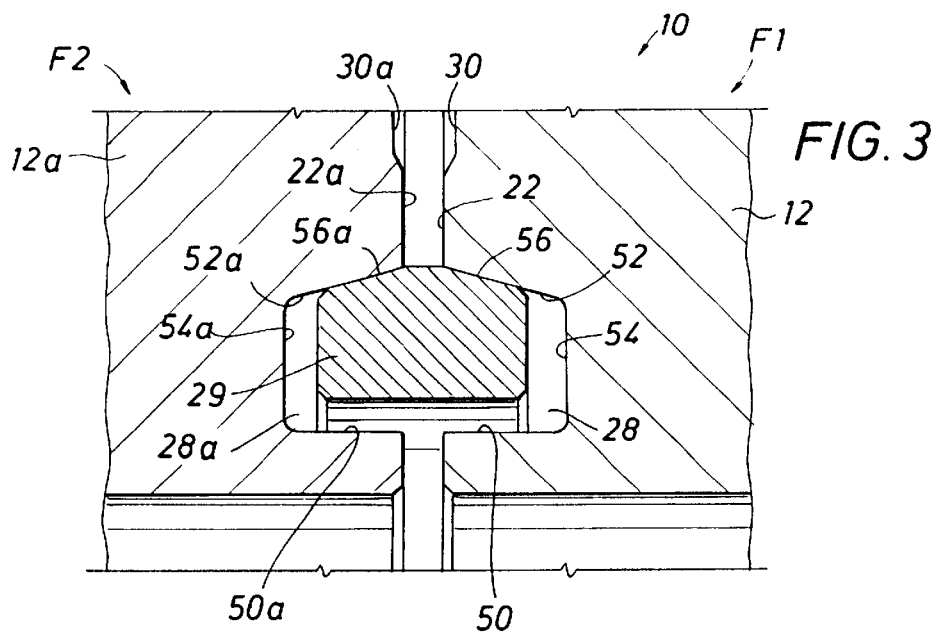
FIG. 3 is an enlarged, fragmentary, sectional view showing one embodiment of a seal ring used in the connection apparatus of the present invention prior to the connection apparatus being assembled.

While metal-to-metal sealing of hub seal faces 22 and 22a is accomplished as described above, optionally, connection apparatus 10 can be provided with a unique metal seal ring, shown as 29 in FIG. 1 and described more fully with references to FIGS. 3–7. With reference then to FIG. 3, a fragmentary portion of connection apparatus 10 and flange assemblies $F_1$ and $F_2$ is shown prior to bolts 40 and nuts 48, 48a being tightened to bring hub seal faces 22 and 22a into metal-to-metal sealing engagement. Seal ring 29 is a metallic annular member, a first portion of which is received in groove 28 and a second portion of which is received in groove 28a. Seal ring groove 28 is defined by an annular, generally cylindrical innermost wall 50, an annular, radially outermost wall 52 and an axially facing end wall 54, wall 52 having an annularly extending, radially inwardly facing frustoconical groove surface. The first portion of seal ring 29 has a radially outwardly facing, annularly extending frustoconical seal ring surface 56 that is complementary to the frustoconical surface formed on wall 52. Generally, the angle of these frustoconical surfaces will be from 5° to 25° as measured between an imaginary line passing through the frustoconical surfaces and the axis or centerline X of the connection apparatus 10.

As seen in FIG. 3, prior to makeup of the connection apparatus 10, e.g., before metal-to-metal sealing between faces 22 and 22a occurs, the frustoconical surface on wall 52 and frustoconical surface 56 are in interference fit with one another. Preferably, prior to makeup, the diameters of surfaces 56, 56a are greater than the diameters 52, 52a by an amount that permits substantially full interference engagement of frustoconical surfaces 56, 56a with at least a portion of frustoconical surfaces 52, 52a, respectively, but prevents engagement of hub seal faces 22, 22a without studs 40 and nuts 48, 48a being tightened sufficiently to result in a radially inwardly compressive force on ring 29 sufficient to permit such metal-to-metal engagement of hub seal faces 22, 22a. Accordingly, as the connection assembly 10 is made up, ring 29 is compressed radially inwardly to the position shown in FIG. 4. However, note that because there are clearances between walls 54 and 54a and the axial ends of ring 29, as well as an annular clearance between walls 50 and 50a of the ID of ring 29, ring 29 is at all times free to float within those clearances. This unique design prevents seal ring 29 from being excessively deformed, unlike metal seal rings used in standard flange designs, which, of necessity, require that the metal seal rings effectively be crushed to effect metal-to-metal sealing. This oversizing of seal ring 29 relative to the grooves 28, 28a intentionally induces compressive strain on ring 29 in a collapse mode that exceeds the yield strength of the material of ring 29. This ensures that surfaces 56, 56a are firmly seated against surfaces 52, 52a with a compressive—bearing stress that essentially matches the yield strength of the material of ring 29.

Figure 4:
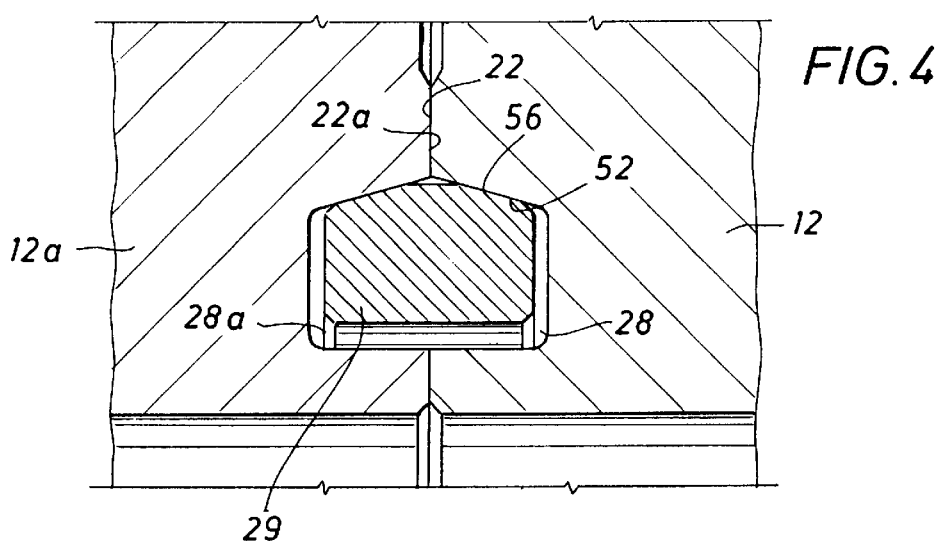
FIG. 4 is a view similar to FIG. 3 showing the seal ring of FIG. 3 after the connection apparatus has been assembled.
Figure 5:
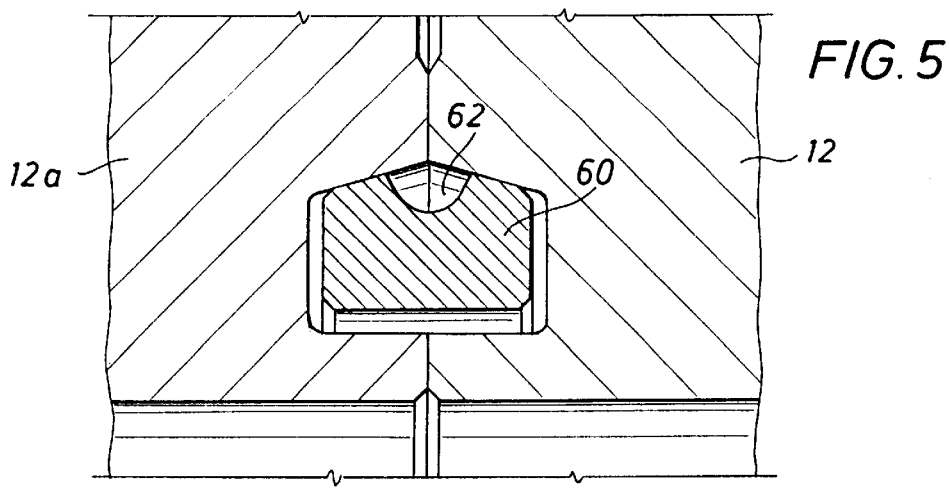
FIG. 5 is a view similar to FIG. 4 showing yet another embodiment of a seal ring used in the connection apparatus of the present invention.

With reference now to FIG. 5, there is shown a modification of the seal rings shown in FIGS. 3 and 4. Seal ring 60, shown in FIG. 5, is provided with a radially outwardly facing, annularly extending groove 62. Groove 62 serves the purpose of providing a pry groove in the effect that when the seal is disassembled, the seal ring sticks on the frustoconical surfaces of the grooves 28, 28a. Thus, removal of ring 60 can be easily achieved.

Figure 6:
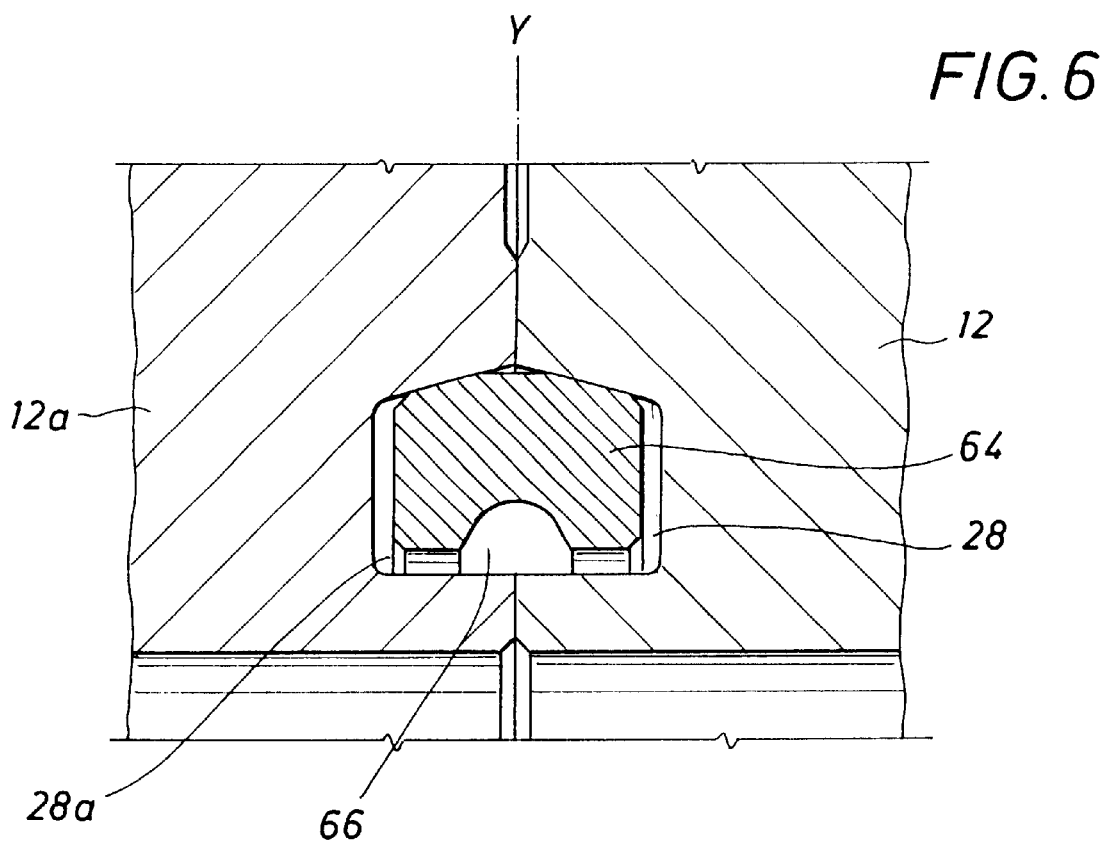
FIG. 6 is a view similar to FIG. 4 showing yet another embodiment of a seal ring used in the connection apparatus of the present invention.

With reference now to FIG. 6, there is shown yet another embodiment of the seal ring of the present invention. Seal ring 64, shown in FIG. 6, is essentially the same as seal ring 29, shown in FIGS. 3 and 4, with the exception that there is an annularly extending, radially inwardly facing groove 66. Groove 66 increases the flexibility of seal ring 64 by basically providing an annularly extending hinge line, shown as Y in FIG. 6. Thus, groove 66 permits ring 64 to flex slightly along the hinge line Y as interference develops between the frustoconical surfaces on the seal ring 64 and the grooves 28, 28a as the studs 40 and nuts 48, 48a are tightened. The stresses that develop in seal ring 64 will be a combination of compressive stresses from collapse loading, as well as bending stresses along hinge line Y. While this will result in a reduction of loading between the frustoconical surfaces of the ring 64 and the groove walls 52, 52a, this is offset by the added flexibility of ring 64, which enhances its ability to act as a pressure energizing seal under bending loads. As well, groove 66 also serves the desirable purpose of providing a pry groove in the effect the frustoconical surfaces on seal ring 64 stick to the frustoconical surfaces 52, 52a in grooves 28, 28a.

Figure 7:
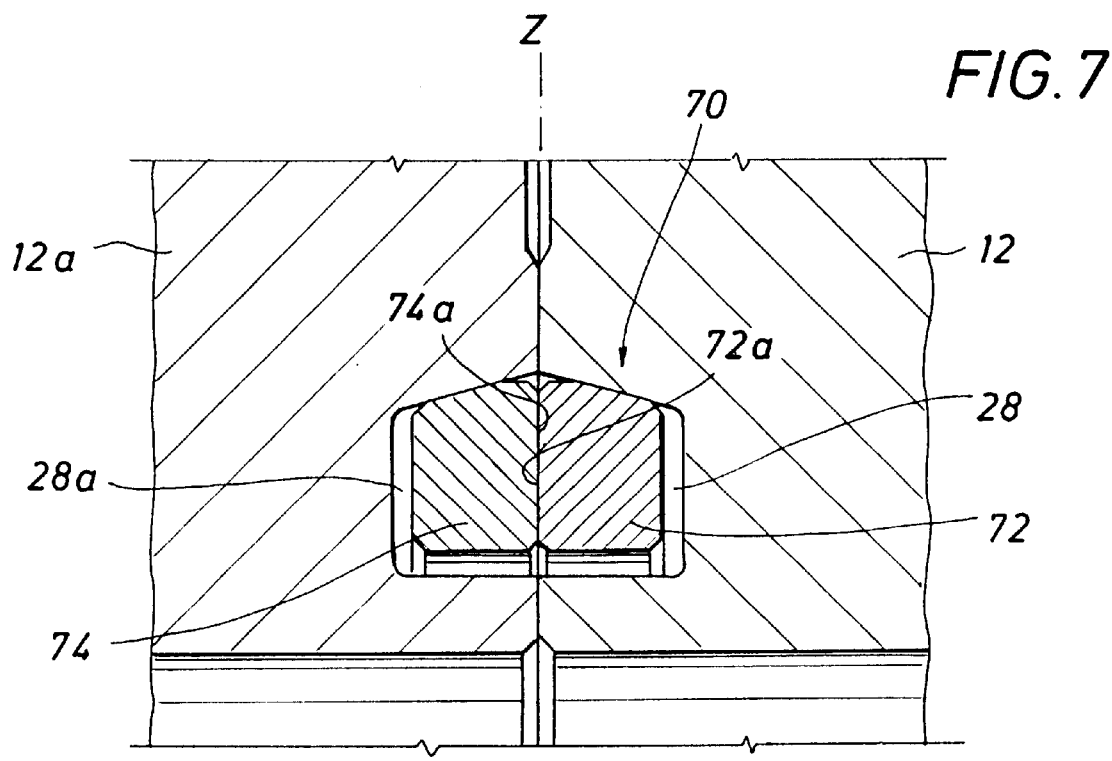
FIG. 7 is a view similar to FIG. 4 showing yet another embodiment of a seal ring used in the connection apparatus of the present invention.

With reference now to FIG. 7, there is shown yet another embodiment of the seal of the present invention. Unlike the seal rings shown in FIGS. 3–6, seal 70, shown in FIG. 7, is comprised of a first seal ring segment 72 and a second seal ring segment 74, seal ring segment 72 being received in seal ring groove 28, seal ring segment 74 being received in seal ring groove 28a. Other than being split along the centerline Z, as shown in FIG. 7, seal ring 70 possesses substantially all of the features described above with respect to the seal rings shown in FIGS. 3–6. Seal ring 70 provides all the benefits of metal-to-metal sealing achieved with the seal rings shown in FIGS. 3–6 with the convenience of using two O-rings and described more fully hereinafter with respect to another embodiment of the present invention. However, unlike the unitary or monolithic seal rings shown in FIGS. 3–6, seal ring 70, with its two-segment design, permits components to be removed from the tubular systems being connected without any substantial axial flange spreading. In this regard, it will be noted that when the studs and bolts have been loosened and removed, hub faces 22 and 22a can be slid relative to one another. It will be understood that when studs 40 and nuts 48, 48a are tightened sufficiently to form metal-to-metal sealing between hub seal faces 22, 22a, there is also metal-to-metal sealing between the seal ring faces 72a and 74a.

The metal seal rings of the present invention, as shown in FIGS. 3–7, provide exceptional sealing capability at wide ranges of temperature and pressure. Both high and low pressures are sealed by an interference dimensioning (described above) of the frustoconical surfaces and the seal rings in the range of 5° to 25°, preferably 10° to 20°, as measured between an imaginary line through the frustoconical surface on the seal ring and the axis or centerline of the connective apparatus. Furthermore, all of the seal ring configurations described in FIGS. 4–7 above achieve the advantage of pressure-energized sealing under extreme adverse conditions, such as extreme temperatures, that can relieve the compressive stresses in the seal ring, or under high bending loads that may tend to separate the hub seal faces 22, 22a.

Figure 2:
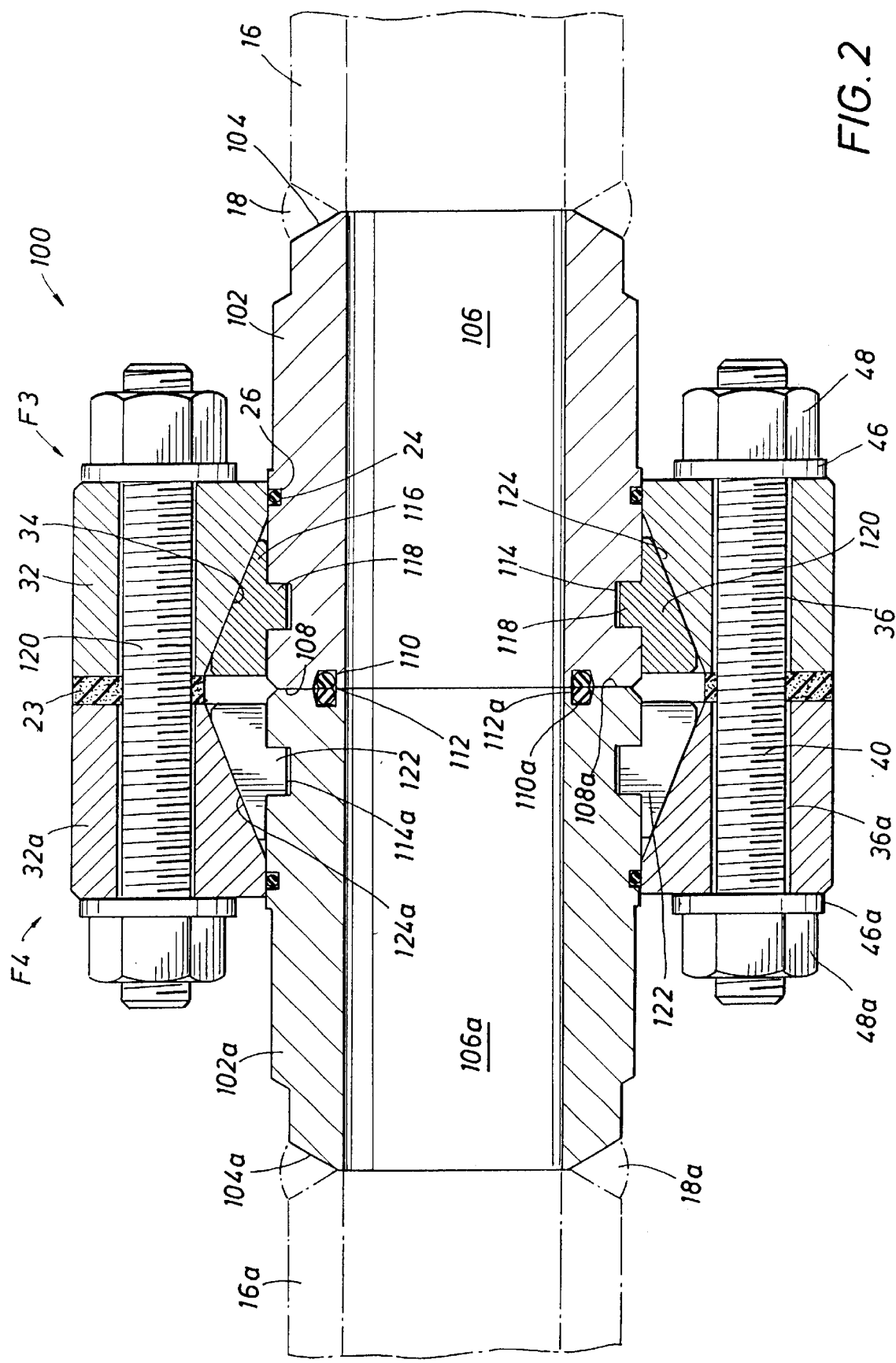
FIG. 2 is a view similar to FIG. 1 showing another embodiment of the connection apparatus of the present invention.

With reference now to FIG. 2, there is shown another embodiment of the connection apparatus of the present invention. Fundamentally, the connection apparatus, shown generally as 100 in FIG. 2, differs from connection apparatus 10, shown in FIG. 1, in that whereas the hubs 12 and 12a of connection apparatus 10 are monolithic bodies, the hubs of connection apparatus 100 are comprised of interfitting members, as described more fully hereinafter. Connection apparatus 100 is comprised of flange assemblies $F_3$ and $F_4$. As in the case of connection apparatus 10 in flange assemblies $F_1$ and $F_2$, flange assemblies $F_3$ and $F_4$ are identical with the exception that flange assembly $F_3$ is connected to a first tubular member 16 and flange assembly $F_4$ is connected to a second tubular member 16a. Accordingly, to facilitate an understanding of the flange assemblies $F_3$ and $F_4$, corresponding components of flange assembly $F_4$ will be given the same reference numerals as used with the components of $F_3$ with the exception that the reference numerals used to describe the components of $F_4$ will be followed by the letter "a." Flange assembly $F_3$ comprises a tubular nipple 102 having a connection end 104 that is secured to tubular member 16 by a weld 18. Nipple 102 defines a flow path 106. Nipple 102 has an annularly extending, axially facing seal face 108 in which is formed an annularly extending, axially facing seal ring groove 110 in which is received an O-ring 112.

Nipple 102 is also provided with an annularly extending, radially outwardly facing groove 114. Received in groove 114 are radially inwardly projecting, semiannular tongues 118 of two hub segments 120. Each of hub segments 120 have end faces 122 formed by cutting an annular ring into hub segments 120. End faces 122 are substantially in engagement with one another when connection apparatus 100 is made up. Each hub segment 120 has an annularly extending, radially outwardly facing frustoconical surface 124. It will be understood that groove 114 and semicircular tongues 118 provide interlocking formations that substantially prevent any axial movement of hub segments 120 relative to nipple 102. Thus, and in one embodiment, nipple 102 and hub segments 120 have formations that are projecting as to one and receiving as to the other to interlock hub segments 120 and nipple 102 and to prevent relative axial movement therebetween.

Flange assembly $F_3$ further includes an annular flange 32, as described above with respect to connection apparatus 10. Accordingly, it will be understood that the taper on the surfaces 34 and 124 and the manner of assembling connection apparatus 100 is essentially the same as that described with respect to connection apparatus 10. However, unlike connection apparatus 10, connection apparatus 100 uses dual, elastomeric O-rings 112, 112a received in seal ring grooves 110, 110a. While, as noted, metal-to-metal sealing between faces 108 and 108a can be achieved, O-rings 112, 112a provide backup seals should leaking occur between the metal-to-metal seal between faces 108, 108a. It is also to be understood that while dual O-rings 112, 112a are shown, it will be appreciated that a single elastomeric seal ring could be used as desired. Since they are in contact with each other, dual O-rings possess the advantage that any small visible scratches on faces 108, 108a are neutralized. Thus, minor damage to the metal faces 108, 108a during handling will not impair the sealing ability of connection apparatus 100.

Unlike connection apparatus 10, connection apparatus 100 provides an advantage in that flanges 32, 32a can be positioned on the nipples 102, 102a, respectively, after the nipples have been welded to the pipes, e.g., tubular members 16, 16a. It will also be appreciated that nipple 102 could be designed such that both ends were provided with hub segments 120. This would provide convenience in the building of compact manifold systems without the necessity of welding. Connection apparatus 100 also provides additional advantage over prior art connection systems that employ a single metal ring to seal between flange faces. Components in a piping system, such as, for example, valves, occasionally need to be removed from service for repair. Conventional, prior art low pressure flanges allow easy removal because the gaskets used are made from flat-sheet material, permitting the component to be slipped out between the mating flange faces. On the other hand, flange assemblies subjected to pressure ratings higher than roughly 2,000 psi frequently use a metal ring-type seal that is inserted into a groove machined into each flange face. Such metal ring seals present the disadvantage of requiring spreading of the flange faces far enough apart to remove the ring in order to remove the component from the piping system. However, the use of dual O-rings, as shown in connection apparatus 100, or dual metal seal rings, as shown in FIG. 7, will achieve the benefit of easy removal of a component from a piping system without flange spreading.

One advantage of the connection apparatus of the present invention described above resides in the fact that prior art systems employing metal ring joint gaskets typically require high compressive loads to effect sealing contact of the gaskets. The bolt loads must be high enough to cause the gasket material to exceed its yield point and conform to any irregularities in the groove of the flange, which results in distorting it from its original machined dimensions. Once used, the gasket is normally discarded and a new one installed to avoid the possibility of a leak. By contrast, the metal-to-metal seals effected by the connection apparatus of the present invention will reseal with a virtually unlimited number of removals. Additionally, O-rings, such as O-rings 112, provide a good seal without replacement unless excessively damaged or hardened by service over a long period of time.

It will be recognized that the materials from which the various components of the connection apparatuses of the present invention are made will depend upon the particular use of a connection apparatus. For example, the hubs or nipples being pressure—containing parts should be made of materials that have necessary corrosion or erosion resistance for flowing media. However, flanges, functioning as structural restraints, are typically not exposed to the flowing media. Accordingly, the selection of materials for manufacture of the flanges is determined by the strength required rather than corrosion/erosion resistance. It should be noted that materials that exhibit high corrosion resistance often have low yield strength. However, in the connection apparatus of the present invention, this lower yield strength poses no problem inasmuch as the low yield strength components are loaded in compression before internal pressure from flowing media is applied. In effect, this pre-load offsets the internal pressure stress under operating conditions.

The connection apparatus of the present invention described above provides a great deal of versatility. For example, with respect to connection apparatus 10, the angles of the frustoconical surfaces 20, 34 need not be the same as the angles of the frustoconical surfaces 20a, 34a. Additionally, it will be recognized that flange assembly $F_3$ could be substituted for flange assembly $F_1$, the only difference being, of course, that the metal-to-metal sealing contact area between the hub/nipple would be reduced.

While the connection apparatus of the present invention has been described with reference to a swivel-type flange assembly wherein all force transmitted from the flange to the hub is via mating, frustoconical surfaces, the invention is not so limited. With reference then to FIG. 8, there is shown a typical standard flange assembly 200 wherein the flange portion and the hub portion are monolithic. Thus, flange assembly 200 comprises a first flange assembly $F_5$ and a second flange assembly $F_6$ that are essentially identical for all purposes, save for their connection to different tubular members 16, 16a. Flange assembly $F_5$ has a hub portion 210 monolithic with a flange portion 212. Hub portion 210 has an annular, axially facing hub seal face 214 in which is formed an annularly extending seal ring groove 16 and an annularly extending relief portion 218. Received in registering seal ring grooves 216 and 216a is an annular seal ring 220 that is of metallic construction. The description above, particularly with reference to FIG. 3 regarding seal ring grooves 28, 28a and seal ring 29 is likewise applicable to seal ring grooves 216, 216a and seal ring 220. Thus, with proper dimensioning of reliefs 218, 218a relative to the contact area of hub seal faces 214, 214a and an acceptable surface finish thereon, one can achieve dual metal-to-metal sealing---i.e., between engaged hub seal faces 214 and 214a and by virtue of the metal-to-metal sealing engagement of seal ring 220 with the radially outermost walls of seal ring grooves 216 and 216a.

With reference now to FIG. 9, there is shown a swivel-type flange assembly of the right-angle shouldered type. Connection apparatus 300, shown in FIG. 9, comprises a first flange assembly $F_7$ and a second flange assembly $F_8$. Flange assembly $F_7$ comprises a hub 310 having a cylindrical tubular portion 312 from which projects, in a radially outward direction, an annularly extending lip 314, lip 314 and tubular portion 312 cooperating to define a hub seal face 316. Formed in hub seal face 316 is an annularly extending seal ring groove 318 and an annularly extending relief 320. A metallic seal ring 322 is received in registering annular seal ring grooves 318, 318a. Flange assembly $F_7$ further includes an annular flange 324 that is generally L-shaped when viewed in transverse cross-section, flange 324 being rotatable with respect to hub 310 and having a radially inwardly projecting, annularly extending lip 326 that is engageable with lip 314 whereby when nuts 48, 48a are tightened, lip 326 is urged against lip 316, forcing hub seal faces 316, 316a together. Again, with the proper dimensioning of reliefs 320, 320a relative to hub seal faces 316, 316a, one is able to achieve metal-to-metal sealing between hub seal faces 316 and 316a as the result of the compressive loading imposed by stud 40 and nuts 48, 48a. As well, seal ring 322 cooperates with seal ring grooves 318 and 318a to provide an additional metal-to-metal sealing, as described above with respect to FIG. 8 and, more particularly, with respect to the discussion regarding FIGS. 3 and 4.

It can thus be seen that the connection apparatus of the present invention, including the unique metal seal ring/seal ring groove construction, can convert standard single-piece flanges (FIG. 8), as well as standard swivel-type flanges (FIG. 9), into flange assemblies that exhibit dual metal-to-metal seals. It is further to be observed that, unlike prior art assemblies employing metal seal rings that achieve metal-to-metal sealing by virtue of compressing or crushing a metal seal ring between mating hub faces, in this case the hub seal faces are free to engage each other and form a metal-to-metal seal, which can be more readily accomplished because much of the loading imposed by the stud 40 and nuts 48, 48a is used to force the hub seal faces together rather than being expended in crushing or deforming a metal seal ring therebetween. It will also be appreciated that while the embodiments in FIG. 8 and FIG. 9 have been described with respect to a single segment seal ring, a two segment seal ring, such as shown in FIG. 7, can also be employed with equal advantage.

The unique seal ring/seal ring groove construction of the present invention can be used to provide metal-to-metal sealing between a wide variety of connection assemblies that can be connected to tubular members to provide flow paths wherein the connector assemblies include connector bodies that have engagement or abutment faces that can be compressed together. In general, the unique seal ring/seal ring groove configuration of the present invention can be used with any two tubular bodies that have axially facing surfaces that can accept seal ring grooves that can be brought into register when the axially facing surfaces are brought into engagement with one another, regardless of the type of compression assembly employed. In this regard, while the compression assemblies used in the present invention have been described above with respect to the use of threaded studs and nuts, it is to be understood that it is not so limited. For example, clamps, threaded couplings, and other similar assemblies commonly used in connections of the type under consideration can be used as well. Additionally, it will be appreciated that when the unique seal ring/seal ring groove combination of the present invention is employed, it is not necessary that there be metal-to-metal sealing, as opposed to metal-to-metal engagement, between the hub seal faces or connection body abutment faces. In other words, while the hub seal faces and the connector abutment faces may well provide a metal-to-metal seal--i. e., a fluid-tight seal---metal-to-metal engagement without fluid-tight sealing is also contemplated.

The foregoing description and examples illustrate selected embodiments of the present invention. In light thereof, variations and modifications will be suggested to one skilled in the art, all of which are in the spirit and purview of this invention.

What is claimed is:

1. An apparatus for connecting first and second tubular bodies together comprising:
   (a) a first flange assembly, said first flange assembly comprising:
      (i) a first hub defining a first flow path and having a first, substantially annularly extending, radially outwardly facing frustoconical hub surface, a first, annularly extending, axially facing hub seal face, and a first connection end for connecting to said first tubular body, said first frustoconical hub surface having its greatest diameter more proximate said first hub seal face than said first connection end; and
      (ii) a first annular flange in surrounding relationship to said first hub, said first flange having a first axial end, a second axial end, and a first annularly extending, radially inwardly facing frustoconical flange surface, said first frustoconical flange surface extending substantially from said first end to said second end of said first annular flange, said first frustoconical hub surface being complementary to one another;
   (b) a second flange assembly, said second flange assembly comprising:
      (i) a second hub defining a second flow path and having a second, substantially annularly extending, radially outwardly facing frustoconical hub surface, a second annularly extending, axially facing hub seal face, and a second connection end for connecting to said second tubular body, said second frustoconical hub surface having its greatest diameter more proximate said first hub seal face than said second connection end; and
      (ii) a second annular flange in surrounding relationship to said second hub, said second flange having a first axial end, a second axial end, and a second, annularly extending, radially inwardly facing frustoconical flange surface, said second frustoconical flange surface extending substantially from said first end to said second end of said second flange, said second frustoconical flange surface being complementary to said second frustoconical hub surface; and (c) a compression assembly operatively connected to said first and second flange members to urge said first and second flange assemblies toward one another, and said first and second hub seal faces into metal-to-metal sealing engagement.

2. The apparatus of claim 1 wherein said first hub seal face and said second hub seal faces have first and second annular, registering seal ring grooves and a seal is received in said annular seal ring grooves.

3. The apparatus of claim 2 wherein each of said first and second seal ring grooves are defined by an annular, radially innermost wall, an annular, radially outermost wall, and an axially facing end wall connecting said radially innermost and radially outermost walls and said radially outermost walls have radially inwardly facing, annularly extending frustoconical groove surfaces, said frustoconical groove surfaces having their greatest diameters more proximate said hub seal faces than said end walls.

4. The apparatus of claim 3 wherein said seal comprises an annular metallic ring, said ring having a first portion received in said first seal ring groove and a second portion received in said second seal ring groove, said first portion of said ring having a first radially outwardly facing, annularly extending frustoconical seal ring surface complementary to said frustoconical surface in said first seal ring groove and said second portion of said ring having a second radially outwardly facing, annularly extending frustoconical seal ring surface complementary to said frustoconical groove surface in said second seal ring groove, said frustoconical surfaces on said ring being dimensioned relative to said frustoconical surfaces in said seal ring grooves such that, prior to metal-to-metal sealing between said first and second hub seal faces, there is interference engagement between substantially all of said first frustoconical surface on said seal ring with at least a portion of said frustoconical surface in said first seal ring groove and substantially all of said frustoconical surface on said seal ring with at least a portion of said frustoconical surface in said second seal ring groove.

5. The apparatus of claim 4 wherein said seal ring has a radially outwardly facing, annularly extending recess.

6. The apparatus of claim 4 wherein said seal ring has a radially inwardly facing, annularly extending recess.

7. The apparatus of claim 4 wherein said ring is spaced from said end walls and said radially innermost walls of said first and second seal ring grooves when said first and second hub seal faces are in metal-to-metal sealing engagement.

8. The apparatus of claim 2 wherein said seal comprises a first O-ring seal received in said first seal groove and a second O-ring seal received in said second seal groove.

9. The apparatus of claim 1 wherein said first and second hubs are monolithic bodies.

10. The apparatus of claim 9, wherein there is an annular relief formed in said first hub seal face and a second annular relief formed in said second hub seal face, said first and second reliefs being in register.

11. The apparatus of claim 1 wherein said first annular flange has a first, annularly extending, axially facing flange face and said second flange has a second, annularly extending, axially facing flange face and there is a weather seal disposed between said first and second flange faces.

12. The apparatus of claim 1 wherein there is a first annular weather seal between said first hub and said first flange, said first annular weather seal being disposed distal said first hub seal face, and there is a second annular weather seal between said second hub and said second flange, said second annular weather seal being disposed distal said second hub seal face.

13. The apparatus of claim 1 wherein said first and second flanges have axially extending holes, at least some of said axially extending holes in said first flange being in register with at least some of said axially extending holes in said second flange and said compression assembly includes studs received in said registering holes, said studs having a first threaded end extending axially outwardly of said first flange and a second threaded end extending axially outwardly of said second flange and there is a first threaded nut received on said first threaded end and a second threaded nut received on said second threaded end.

14. The apparatus of claim 1 wherein the angle between an axis coaxial with said first and second flow paths when said first and second hub seal faces are in metal-to-metal sealing engagement and an imaginary line passing through either of said frustoconical surfaces on said first and second hubs is from 10° to 30°.

15. An apparatus for connecting first and second tubular bodies together, comprising:

(a) a first flange assembly, said first flange assembly comprising:
  (i) a first hub defining a first flow path and having a first, substantially annularly extending, radially outwardly facing frustoconical hub surface, a first, annularly extending, axially facing hub seal face, and a first connection end for connecting to said first tubular body, said first frustoconical hub surface having its greatest diameter more proximate said first hub seal face than said first connection end; and
  (ii) a first annular flange in surrounding relationship to said first hub, said first flange having a first annularly extending, radially inwardly facing frustoconical flange surface, said first frustoconical flange surface and said first frustoconical hub surface being complementary to one another;

(b) a second flange assembly, said second flange assembly comprising:
  (i) a second hub defining a second flow path and having a second, substantially annularly extending, radially outwardly facing frustoconical hub surface, a second, annularly extending, axially facing hub seal face, and a second connection end for connecting to said second tubular body, said second frustoconical hub surface having its greatest diameter more proximate said first hub seal face than said second connection end; and
  (ii) a second annular flange in surrounding relationship to said second hub, said second flange having a second, annularly extending, radially inwardly facing frustoconical flange surface, said second frustoconical flange surface being complementary to said second frustoconical hub surface; and (c) a compression assembly operatively connected to said first and second flange members to urge said first and second flange assemblies toward one another, and said first and second hub seal faces into metal-to-metal sealing engagement, the angle between an axis coaxial with said first and second flow paths when said first and second hub seal faces are in metal-to-metal sealing engagement and an imaginary line passing through either of said frustoconical surfaces on said first and second hubs being from 10° to 30°.

16. An apparatus for connecting first and second tubular bodies together, comprising:
(a) a first flange assembly, said first flange assembly comprising:
  (i) a first hub defining a first flow path and having a first annularly extending, axially facing hub seal face; and
  (ii) a first annular flange in surrounding relationship to said first hub;
(b) a second flange assembly, said second flange assembly comprising:
  (i) a second hub defining a second flow path having a second, annularly extending, axially facing hub seal face; and
  (ii) a second annular flange in surrounding relationship to said second hub;
(c) a compression assembly operationally connected to said first and second flange members to urge said first and second flange assemblies toward one another;
(d) a first interconnection between said first hub and said first flange and a second interconnection between said second hub and said second flange whereby when said compression assembly urges said first and second flange assemblies toward one another, said first and second hub seal faces are urged into metal-to-metal sealing engagement;
(e) said first hub seal face and said second hub seal face having first and second annular registering seal ring grooves, each of said first and second seal ring grooves having an annular, radially innermost wall, an annular, radially outermost wall, and an axially facing end wall connecting said radially innermost and radially outermost walls, said radially outermost walls having radially inwardly facing, annularly extending frustoconical groove surfaces, said frustoconical groove surfaces having their greatest diameter more proximate said hub seal faces than said end walls; and
(f) an annular metallic seal ring having a first portion received in said first seal ring groove and a second portion received in said second seal ring groove, said first portion of said seal ring having a first radially outwardly facing, annularly extending frustoconical seal ring surface complementary to said frustoconical surface in said first seal ring groove, said second portion of said seal ring having a second radially outwardly facing, annularly extending frustoconical seal ring surface complementary to said frustoconical groove surface in said second groove, said seal ring further having a radially inwardly facing, annularly extending seal ring surface and first and second opposed axially facing, annularly extending end surfaces, said seal ring being dimensioned relative to said groove such that, prior to metal-to-metal engagement between said first and second hub seal faces, there is substantially full interference engagement between said frustoconical surfaces on said seal ring with at least a portion of said frustoconical surfaces in said grooves, said first and second end faces being spaced from said first and second end walls, respectively, and said radially inwardly facing seal ring surface being spaced from said radially innermost walls of said first and second grooves when said first and second hub seal faces are in metal-to-metal engagement.

17. An apparatus for connecting first and second tubular bodies together, comprising:
(a) a first flange assembly, said first flange assembly comprising:
  (i) a first hub defining a first flow path and having a first annularly extending, axially facing hub seal face; and
  (ii) a first annular flange in surrounding relationship to said first hub;
(b) a second flange assembly, said second flange assembly comprising:
  (i) a second hub defining a second flow path having a second, annularly extending, axially facing hub seal face; and
  (ii) a second annular flange in surrounding relationship to said second hub;
(c) a first interconnection between said first hub and said first flange and a second interconnection between said second hub and said second flange whereby when said compression assembly urges said first and second flange assemblies toward one another, said first and second hub seal faces are urged into metal-to-metal sealing engagement;
(d) said first hub seal face and said second hub seal face having first and second annular registering seal ring grooves, respectively, each of said first and second seal ring grooves having an annular, radially innermost wall, an annular, radially outermost wall, and an axially facing end wall connecting said radially innermost and radially outermost walls, said radially outermost walls having radially inwardly facing, annularly extending frustoconical groove surfaces, said frustoconical groove surfaces having their greatest diameter more proximate said hub seal faces than said end walls;
(e) a seal received in said first and second seal ring grooves, said seal comprising a first metal seal ring segment received in said first seal ring groove and a second metal seal ring segment received in said second seal ring groove, said first seal ring segment having a first axially facing seal ring face, a first opposed end face, a first radially outwardly facing, annularly extending frustoconical seal ring segment surface complementary to said frustoconical groove surface in said first seal ring groove, and a first radially inwardly facing, annularly extending seal ring segment surface, said second seal ring segment having a second axially facing seal ring face, a second opposed end face, a second radially outwardly facing, annularly extending frustoconical seal ring segment surface complementary to said frustoconical groove surface in said second seal ring groove, and a second radially inwardly facing, annularly extending seal ring segment surface, said first frustoconical seal ring segment surface being dimensioned relative to said frustoconical surface in said first seal ring groove and said second frustoconical seal ring segment surface being dimensioned relative to said frustoconical surface in said second seal ring groove such that there is full interference engagement between substantially all of said first frustoconical seal ring segment surface and at least a portion of said frustoconical surface in said first seal ring groove and substantially all of said second frustoconical seal ring segment surface and at least a portion of said frustoconical surface in said second seal ring groove prior to metal-to-metal engagement between said first and second hub seal faces, said first and second seal ring faces on said first and second seal ring segments being in metal-to-metal sealing engagement, said first and second end faces being spaced from said first and second end walls, respectively, and said first and second radially inwardly facing seal ring segment surfaces being spaced from said innermost walls of said first and second grooves, respectively, when said first and second hub seal faces are in metal-to-metal engagement; and (f) a compression assembly operatively connected to said first and second flange members to urge said first and second flange assemblies toward one another.

18. An apparatus for connecting first and second tubular-bodies together, comprising:

(a) a first connector for connecting to said first tubular body, said first connector comprising a first connector body defining a first flow path and having a first annularly extending, axially facing connector abutment face;

(b) a second connector for connecting to said second tubular body, said second connector comprising a second connector body defining a second flow path and having a second, annularly extending, axially facing connector abutment face, said first connector abutment face and said second connector abutment face having first and second annular registering seal ring grooves, each of said first and second seal ring grooves having an annular, radially innermost wall, an annular, radially outermost wall, and an axially facing end wall connecting said radially innermost and radially outermost walls, said radially outermost walls having radially inwardly facing, annularly extending frustoconical groove surfaces, said frustoconical groove surfaces having their greatest diameter more proximate said connector abutment faces than said end walls; and (c) an annular metallic seal ring having a first portion received in said first seal ring groove and a second portion received in said second seal ring groove, said first portion of said seal ring having a first radially outwardly facing, annularly extending frustoconical seal ring surface complementary to said frustoconical surface in said first seal ring groove, said second portion of said seal ring having a second radially outwardly facing, annularly extending frustoconical seal ring surface complementary to said frustoconical groove surface in said second groove, said seal ring having an annularly extending, radially inwardly facing seal ring surface and first and second axially facing, annularly extending end surfaces, said seal ring being dimensioned relative to said groove such that, prior to engagement between said first and second connector abutment faces, there is substantially full interference engagement between said frustoconical surfaces on said seal ring with at least a portion of said frustoconical surfaces in said grooves, said first and second end faces being spaced from said first and second end walls, respectively, and said radially inwardly facing seal ring surface being spaced from said radially innermost walls of said first and second grooves when said first and second connector abutment faces are in metal-to-metal engagement; and (d) a compression assembly operatively connected to said first and second connectors to urge said first and second connector abutment faces toward one another.

19. The apparatus of either of claims 16 or 17 wherein said first annular flange is rotatable about said first hub and said second annular flange is rotatable around said second hub.

20. The apparatus of any of claims 16, or 17 wherein said metal-to-metal engagement between said first and second hub seal faces is metal-to-metal sealing.

21. The apparatus of claim 18 wherein said metal-to-metal engagement between said first and second connector abutment faces is metal-to-metal sealing.

22. The apparatus of any of claims 16, 17, or 18 wherein the angle of said frustoconical surfaces as measured between an axis coaxial with said flow paths and an imaginary line passing through said frustoconical surface is from 5° to 25°.

* * * * *